Dec. 3, 1940.   F. E. BACHMAN   2,223,656
SNUBBER
Filed Aug. 2, 1939   2 Sheets-Sheet 1
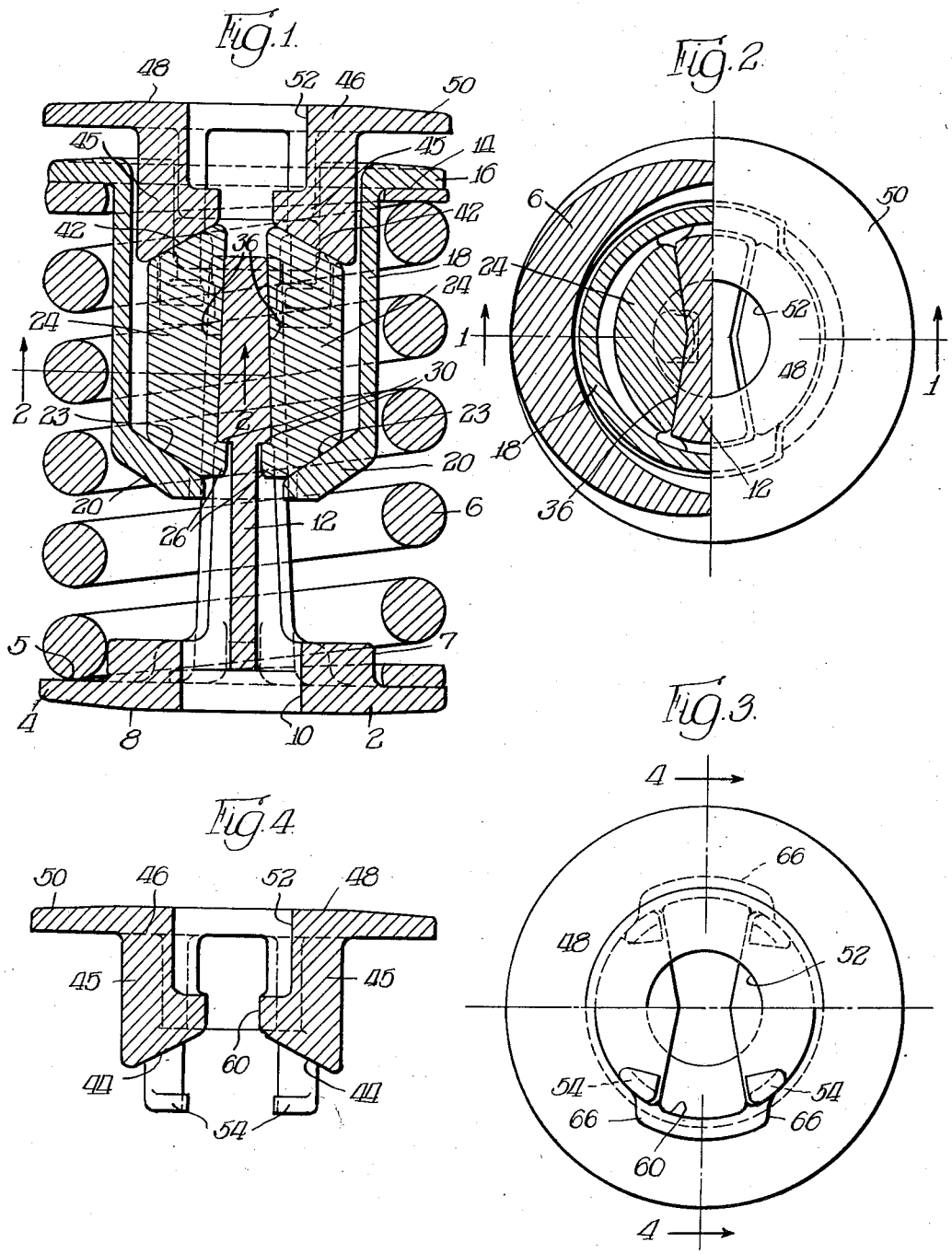
INVENTOR.
Fred F. Bachman,
BY
ATTORNEY.

Dec. 3, 1940.    F. E. BACHMAN    2,223,656
SNUBBER
Filed Aug. 2, 1939    2 Sheets-Sheet 2
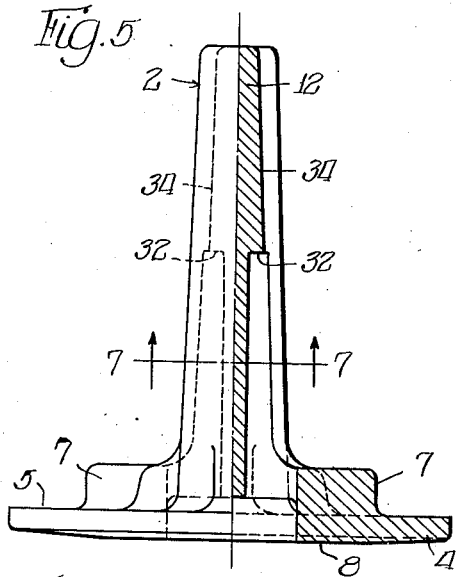
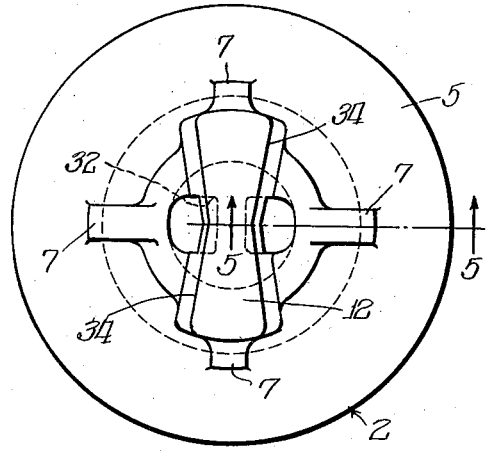
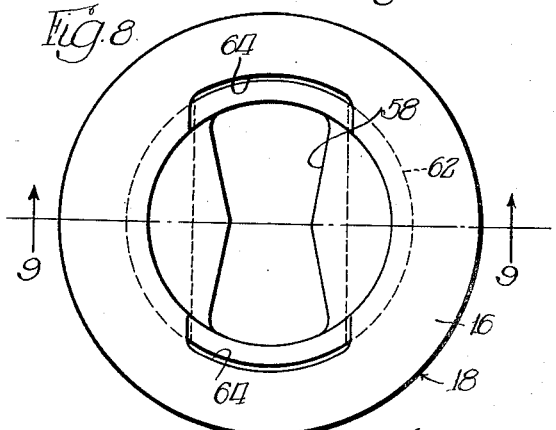
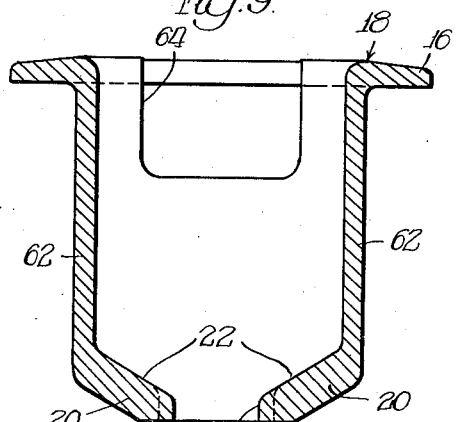
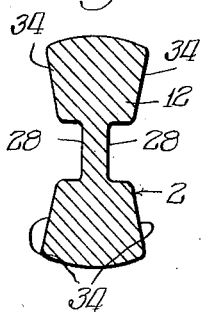
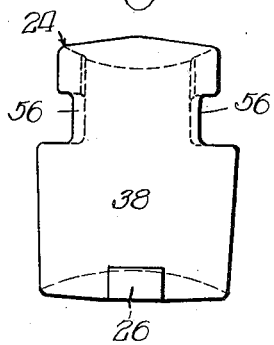
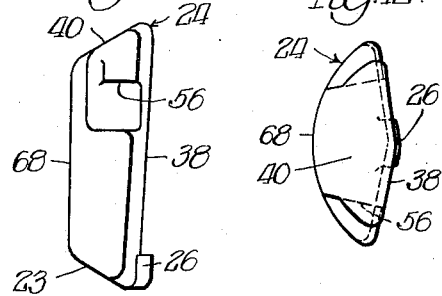
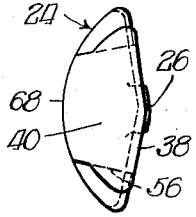
INVENTOR.
Fred E. Bachman,
BY
ATTORNEY.

Patented Dec. 3, 1940

2,223,656

UNITED STATES PATENT OFFICE 2,223,656

SNUBBER

Fred E. Bachman, Chicago, Ill., assignor to American Steel Foundries, Chicago, Ill., a corporation of New Jersey Application August 2, 1939, Serial No. 287,832

27 Claims. (Cl. 267—9)

My invention relates to a friction absorbing device or snubber designed particularly for use on railway car trucks and suitable for insertion in place of an ordinary coil spring in a spring nest of any one of many types commonly used.

An object of my invention is to devise a friction absorbing device of compact form capable of absorbing an amount of energy sufficient to eliminate the bouncing action of ordinary coil springs when used in combination therewith under varying loads.

I have devised a novel arrangement which is capable of absorbing a relatively large amount of energy for the small space involved and the form of the structure is such that relatively large bearing areas can be provided with backing of sufficient metal to afford relatively long life in use.

My invention comprehends an arrangement in which the parts are self-interlocking whereby the device may be conveniently handled as a unit.

My novel arrangement contemplates a particularly compact assembly of the friction parts of relatively simple form and capable of embodiment in modifications to afford greater or less friction absorbing capacity as required within the small space normally occupied by a single coil.

Figure 1 is a sectional view bisecting a friction absorbing device embodying my invention, the section being taken in the vertical plane substantially indicated by the line 1—1 of Figure 2;

Figure 2 is a top plan view, half in section, the section being taken in the horizontal plane substantially as indicated by the line 2—2 of Figure 1;

Figure 3 is a plan view of my novel form of wedge cap, the upper half thereof showing the top plan and the lower half thereof the bottom plan;

Figure 4 is a sectional view through the wedge cap shown in Figure 3, the section being taken in the vertical plane indicated by the line 4—4 of Figure 3;

Figure 5 is an elevation, half in section, of the combined base and center post structure used in my novel device, the section being taken substantially in the vertical plane indicated by the line 5—5 of Figure 6;

Figure 6 is a top plan view of the center post structure shown in Figure 5, and Figure 7 is a sectional view therethrough, the section being taken substantially in the planes indicated by the line 7—7 of Figure 5;

Figure 8 is a top plan view of the sleeve utilized in my snubber structure, and Figure 9 is a sectional view therethrough taken substantially in the vertical plane bisecting the sleeve as indicated by the line 9—9 of Figure 8;

Figure 10 is an elevation of the inner face of my novel form of friction shoe, Figure 11 is a side elevation thereof and Figure 12 an end view taken from the upper end thereof.

In the embodiment shown herein, my novel device comprises the combination base and center post 2 formed with an annular flange 4 about its perimeter serving as a seat as at 5 for the coil spring 6 which is further positioned by the laterally projecting lugs 7, 7 (Figures 5 and 6). Said base member presents an arcuate base at 8 upon which the device may seat and rock slightly. Centrally formed in the base is the cavity 10 which may serve as positioning means. Upwardly projecting from the base is the center post 12, the configuration of which is best seen from a consideration of Figures 5, 6 and 7 and hereafter more particularly described. The upper end of the spring is seated as at 14 against the annular flange 16 formed at the top of the sleeve 18 at the inner end of which are formed the tapering walls 20, 20 at opposite sides thereof. On the top surfaces of the walls 20, 20 are formed the flat diagonal friction surfaces 22, 22 (Figure 9) upon which may be seated as at 23, 23 similar friction shoes or wedges 24, 24 at opposite sides of the device. Centrally formed at the lower end of each friction shoe is the lug 26 slidably fitted within the vertical slot 28 formed on either side of the center post 12. The said lugs 26, 26 have engagement as at 30, 30 with the shoulders 32, 32 formed on opposite sides of said center post at the lower ends of the sloping V-shaped surfaces 34, 34, said surfaces having engagement as at 36, 36 with complementary surfaces 38, 38 formed on the wedges 24, 24. At the upper ends of the wedges 24, 24 are formed the diagonally arranged flat friction faces 40, 40 having engagement as at 42, 42 with the diagonal friction faces 44, 44 formed adjacent the lower ends of the lugs 45, 45, said lugs being integral parts of the wedge cap 46. The wedge cap 46 presents an outer face 48 of arcuate form as a convenient seat for one end of the device and has the annular flange 50 overlying the annular flange 16 of the sleeve 18. Centrally formed in the top wall of the wedge cap 46 is the opening 52 which may serve as positioning means therefor. At the lower ends of the lugs 45, 45 are the studs 54, 54 projecting inwardly at their extremities to cooperate as interlocking means with the slots 56, 56 (Figure 10) formed at opposite sides of the friction shoes.

It will thus be seen that the friction parts of my novel device are housed within the sleeve 18 which in turn is fitted within the outer coil spring 6. In assembling the device, the wedge cap 46, the sleeve 18 and the friction shoes are assembled as a unit. The coil spring 6 is fitted therearound and the base is then brought into position with the center post 12, being inserted into the opening 58 at the bottom of the sleeve 18 and forced into its normal operating position, thus urging the shoes into tight engagement with the friction surfaces at 23, 36 and 42. After assembly the parts are retained in proper relationship by the before mentioned interlocking shoulders at 30, 30 between the center post and the friction shoes and by the interlocking means already described between the slots 56 at the top of the shoes and the studs 54 at the bottom of the wedge cap.

The detail form of the wedge cap is shown in Figures 3 and 4. The central opening 60 formed therein between the studs 45, 45 is of such form as to accommodate the projection therethrough of the top portion of the center post 12 in operation of the device. The detail structure of the combination base and center post is shown in Figures 5, 6 and 7. The sleeve 18 is shown in detail in Figures 8 and 9. It is a cup-like structure with cylindrical walls 62, 62 with diagonally arranged thickened walls 20, 20 at its lower ends presenting friction surfaces 22, 22 on their upper faces as already described. The opening 58 between the bottom walls 20, 20 accommodates the projection therethrough of the center post 12 and is of configuration similar thereto. At the top of the sleeve is formed the annular flange 16 as already described and adjacent the upper end of the cup-like structure are formed in the walls 62 the shallow recesses 64, 64, the lateral edges of which cooperate with the shoulders 66, 66 (Figure 3) formed at opposite sides of the wedge cap and serve to prevent relative rotation between said wedge cap and said sleeve. The form of the friction shoes is shown in detail in Figures 10, 11 and 12. The outer surface of the shoe is of cylindrical form as indicated at 68 (Figure 12) conforming to the contour of the walls of the sleeve 18 and the inner face of the shoe is of shallow wedge shape forming the friction surface 38 as already described. At the opposite ends of each shoe are formed the diagonally arranged flat friction faces already mentioned.

As the device is placed under load pressure of the wedge cap 46 urges the shoes 24, 24 downwardly. As the shoes move downwardly their diagonal faces in abutment with the center post compel them to move outwardly against the friction developed at their opposite ends which are in engagement respectively with the friction surfaces on the wedge cap and on the sleeve. Friction is thus developed at both ends of the shoes and also at their areas in engagement with the center post, thus affording a maximum area for development of friction. When the load is released the recoil of the spring 6 causes the parts to assume their normal operation position as shown in Figure 1.

It is to be understood that I do not wish to be limited by the exact embodiment of the device shown which is merely by way of illustration and not limitation as various and other forms of the device will of course be apparent to those skilled in the art without departing from the spirit of the invention or the scope of the claims.

I claim:

1. In a friction absorbing device, a base follower presenting a center post wedge, a coil spring seated on said follower, a sleeve seated at the opposite end of said spring and extending therewithin, friction shoes housed within said sleeve and having diagonal face engagement therewith at their inner ends and having wedge shaped face engagement with said wedge, a top follower extending within said sleeve and in abutment with said shoes, cooperating means on said top follower and said sleeve to prevent their relative rotation, and means on said shoes interlocking with said wedge post and said top follower to retain said device in assembly.

2. In a friction absorbing device, a base follower presenting a center post wedge, a coil spring seated on said follower, a sleeve seated at the opposite end of said spring and extending therewithin, friction shoes housed within said sleeve and having diagonal face engagement therewith at their inner ends and having wedge shaped face engagement with said wedge, a top follower extending within said sleeve in abutment with said shoes, and means on said shoes interlocking with said wedge post and said top follower to retain said device in assembly.

3. In a friction absorbing device, a base follower having a center post wedge, a coil spring, a sleeve seated on said coil spring and extending therewithin around said wedge, friction shoes housed within said sleeve in abutment therewith and having friction faces in engagement with said wedge, a top follower extending within said sleeve to abut said friction shoes, interlocking means on said top follower and said shoes, interlocking means on said shoes and said wedge, and means on said top follower cooperating with means on said sleeve to limit their relative rotation.

4. In a friction absorbing device, a base follower presenting a center post wedge, a coil spring seated on said follower, a sleeve seated at the opposite end of said spring and extending therewithin, friction shoes housed within said sleeve and having diagonal face engagement therewith at their inner ends and having wedge shaped face engagement with said wedge for urging said shoes outwardly, a top follower extending within said sleeve in abutment with said shoes, and cooperating means on said top follower and said sleeve to prevent their relative rotation.

5. In a friction absorbing device, a base follower presenting a center post wedge, a coil spring seated on said follower, a sleeve seated at the opposite end of said spring and extending therewithin, friction shoes housed within said sleeve and having diagonal face engagement therewith at their inner ends and having wedge shaped face engagement with said wedge, a top follower extending within said sleeve in abutment with said shoes, and interlocking means on said top follower and said shoes serving to retain said shoes and follower in assembly.

6. In a friction absorbing device, a base follower presenting a center post wedge, a coil spring seated on said follower, a sleeve seated at the opposite end of said spring and extending therewithin, friction shoes housed within said sleeve and having diagonal face engagement therewith at their inner ends and having wedge shaped face engagement with said wedge, a top follower extending within said sleeve in abutment with said shoes, and interlocking means comprising lugs on said shoes engaging shoulders on said wedge post.

7. In a friction absorbing device, a base follower having a center post wedge, a coil spring, a sleeve seated on said coil spring and extending therewithin around said wedge, friction shoes housed within said sleeve in abutment therewith and having friction faces in engagement with said wedge urging said shoes outwardly, a top follower extending within said sleeve and having friction surfaces in engagement with said friction shoes, and means on said top follower cooperating with means on said sleeve to limit their relative rotation.

8. In a friction absorbing device, a base follower having a center post wedge, a coil spring, a cylindrical sleeve seated on said coil spring and extending therewithin around said wedge, friction shoes housed within said sleeve in abutment therewith and having friction faces in engagement with said wedge, a top follower extending within said sleeve and having friction surfaces in engagement with said friction shoes, and means on said shoes adjacent said abutment of said shoes with said sleeve interlocking with means on said wedge to retain said parts in assembly.

9. In a friction absorbing device, a base follower presenting a center post wedge, a coil spring seated on said follower, a sleeve seated at the opposite end of said spring and extending therewithin, friction shoes housed within said sleeve and having diagonal face engagement therewith at their inner ends and having wedge shaped face engagement with said wedge, and a top follower extending within said sleeve in abutment with said shoes, said shoes being urged outwardly by said wedge into tight frictional engagement with said follower and said sleeve.

10. In a friction absorbing device, a base follower having a center post wedge, a coil spring, a sleeve seated on said coil spring and extending therewithin around said wedge, friction shoes housed within said sleeve and having friction faces in engagement with said wedge, a top follower extending within said sleeve and having friction surfaces in engagement with the tops of said friction shoes, and interlocking means on said top follower and said shoes whereby said shoes and follower are maintained in assembly.

11. In a friction absorbing device, a base follower having a center post wedge, a coil spring, a cylindrical sleeve seated on said coil spring and extending therewithin around said wedge, friction shoes housed within said sleeve in abutment therewith and having friction faces in engagement with said wedge, a top follower extending within said sleeve and having friction surfaces in engagement with said friction shoes, and interlocking means on said shoes and said wedge adjacent said abutment of said shoes with said sleeve.

12. In a friction absorbing device, a bottom follower with an upright wedge post, a coil spring, a member seated on said spring and sleeved therewithin around said wedge, friction shoes housed within said member in frictional engagement therewith and with said wedge post, said wedge post urging said shoes outwardly and a top follower seated on said shoes, the engagement of said friction shoes with said sleeve being along opposed diagonally arranged flat friction faces.

13. In a friction absorbing device, a bottom follower with an upright wedge post, a coil spring, a member seated on said spring and sleeved therewithin around said wedge, friction shoes housed within said member in frictional engagement therewith and with said wedge post, and a top follower seated on said shoes, the engagement of each of said friction shoes with said wedge being along diagonally arranged wedge shaped faces for urging said shoes into tight frictional engagement with said follower and member.

14. In a friction absorbing device, a bottom follower with an upright wedge post, a coil spring, a member seated on said spring and sleeved therewithin around said wedge, friction shoes housed within said member in frictional engagement therewith and with said wedge post, a top follower seated on said shoes, and means on said shoes engaging said top follower and said wedge post to retain said parts in assembled relationship.

15. In a friction absorbing device, a bottom follower having a wedge post, a coil spring, a member seated on said spring and sleeved therewithin around said wedge post, friction shoes seated within said member and having friction faces in engagement with said post, a top follower seated on said shoes, and means on said shoes cooperating with means on said wedge post and top follower to retain said parts in assembled relationship.

16. In a friction absorbing device, a base follower having a center post wedge, a coil spring, a sleeve seated on said coil spring and extending therewithin around said wedge, friction shoes housed within said sleeve and having friction faces in engagement with said wedge, and a top follower extending within said sleeve and having sliding abutment with the tops of said friction shoes, said wedge urging said shoes into tight engagement with said follower and sleeve.

17. In a friction absorbing device, a bottom follower with an upright wedge post, a coil spring, a member seated on said spring and sleeved therewithin around said wedge, friction shoes housed within said member in tapering frictional engagement therewith and with said wedge post, and a top follower seated on said shoes, the engagement of said top follower with said shoes being along opposed diagonally arranged flat faces for frictionally resisting outward movement thereof.

18. In a friction absorbing device, a bottom follower with an upright wedge post, a coil spring, a member seated on said spring and sleeved therewithin around said wedge, friction shoes housed within said member in frictional engagement therewith and with said wedge post for urging said shoes outwardly, a top follower seated on said shoes, and cooperating means on said top follower and said sleeve to limit their relative rotation.

19. In a friction absorbing device, a bottom follower with an upright wedge post, a coil spring, a member seated on said spring and sleeved therewithin around said wedge, friction shoes housed within said member in tapering frictional engagement therewith and with said wedge post, and a top follower seated on said shoes and frictionally resisting outward movement thereof.

20. In a friction absorbing device, a bottom follower having a wedge post, a coil spring, a member seated on said spring and sleeved therewithin around said wedge post, friction shoes seated within said member and having friction faces in engagement with said post, and a top follower seated on said shoes, said follower and said member being disposed to resist outward movement of said shoes.

21. In a friction absorbing device, a coil spring, a cylindrical member seated on said spring and extending therewithin, top and bottom members projecting within said cylindrical member, wedge members frictionally engaging said top, bottom, and cylindrical members along tapering faces, and a plurality of interengaging means on said members to retain operative relationship therebetween.

22. In a friction absorbing device, a bottom follower having a wedge post, a coil spring, a member seated on said spring and sleeved therein around said wedge post, friction shoes seated within said member and having friction faces in engagement with said post, a top follower seated on said shoes, and means interlocking said shoes, said follower, and said member to retain said device in operative relationship.

23. In a friction absorbing device, a bottom follower with an upright center post, a coil spring, a member seated on said spring and sleeved therewithin around said post, a top follower extending within said member, shoes having diagonal face engagement with said follower, said member, and said post, and means on said shoes interlocking with said post and said follower to retain said device in assembly.

24. In a friction absorbing device, a bottom follower with an upright center post, a coil spring, a member seated on said spring and sleeved therewithin around said post, a top follower extending within said member, and friction shoes having a plurality of tapering faces engaging complementary faces on said wedge, said member, and said follower, and means on said follower engaging said shoes and said member to maintain operative relationship therebetween.

25. In a friction absorbing device, a bottom follower with an upright center post, a coil spring, a member seated on said spring and sleeved therewithin around said post, a top follower extending within said member, and friction shoes having a plurality of tapering faces engaging complementary surfaces on said wedge, said member, and said follower, certain of said faces urging said shoes outwardly and certain other of said faces being disposed for resistance of the outward movement.

26. In a friction absorbing device, a bottom follower with an upright center post, a coil spring, a member seated on said spring and sleeved therewithin around said post, a top follower extending within said member, and friction shoes having oppositely directed tapering faces engaging complementary faces on said follower and said member and having V-shaped faces engaging complementary faces on said post between their engagement with said follower and said member.

27. In a friction absorbing device, a bottom follower with an upright center post, a coil spring, a member seated on said spring and sleeved therewithin around said post, a top follower extending within said member, and friction shoes engaging said member and said follower along oppositely directed tapering faces and engaging said wedge along tapering V-shaped faces whereby said shoes are urged outwardly during operation.

FRED E. BACHMAN.